US012587286B2

(12) United States Patent
Zhao et al.

(10) Patent No.: US 12,587,286 B2
(45) Date of Patent: Mar. 24, 2026

(54) QUANTUM TELEPORTATION IMAGING

(71) Applicant: Cisco Technology, Inc., San Jose, CA (US)

(72) Inventors: Jiapeng Zhao, Kenmore, WA (US); Hassan Shapourian, San Mateo, CA (US); Eneet Kaur, Somerville, MA (US); Shadi Ebrahimi Asl, Raleigh, NC (US); Ramana Rao V R Kompella, Foster City, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 228 days.

(21) Appl. No.: 18/444,909

(22) Filed: Feb. 19, 2024

(65) Prior Publication Data

US 2025/0323733 A1 Oct. 16, 2025

(51) Int. Cl.
H04B 10/70 (2013.01)
B82Y 15/00 (2011.01)

(52) U.S. Cl.
CPC .............. H04B 10/70 (2013.01); B82Y 15/00 (2013.01)

(58) Field of Classification Search
CPC ................................ H04B 10/70; B82Y 15/00
See application file for complete search history.

(56) References Cited

U.S. PATENT DOCUMENTS 11,728,902 B1 * 8/2023 Meyers .................. H04B 10/11
398/118
2009/0194702 A1 8/2009 Meyers et al.

2009/0317089 A1 * 12/2009 Peters ................... H04L 9/0855
398/173
2015/0055961 A1 * 2/2015 Meyers .................. H04B 10/70
398/140
2021/0105135 A1 4/2021 Figueroa et al.
2022/0085985 A1 3/2022 Kaplan
(Continued)

OTHER PUBLICATIONS

Bornman, N., et al., "Ghost Imaging Using Entanglement-swapped Photons", npj, Quantum Information, vol. 5, No. 63, https://arxiv.org/pdf/quant-ph/0007026.pdf, Jul. 26, 2019, 6 pages.
(Continued)

*Primary Examiner* — Mohammad W Reza
(74) *Attorney, Agent, or Firm* — Edell, Shapiro & Finnan, LLC

(57) ABSTRACT

In some aspects, the techniques described herein relate to a method including: providing, from a first endpoint, an unentangled photon containing image information to an intermediate server via a first multimode fiber; generating, at a second endpoint, an entangled photon pair including a first entangled photon and a second entangled photon; providing, from the second endpoint, the first entangled photon to the intermediate server via a second multimode fiber; Bell state measuring the unentangled photon and the first entangled photon at the intermediate server to swap entanglement of the first entangled photon such that the unentangled photon becomes entangled with the second entangled photon; providing, from the intermediate server to the second endpoint, results of the Bell state measuring; and generating an image corresponding to the image information at the second endpoint using the second entangled photon and the results of the Bell state measuring.

20 Claims, 5 Drawing Sheets

(56) References Cited

U.S. PATENT DOCUMENTS

| 2022/0113529 | A1 | 4/2022 | Bond et al. |
| 2023/0188548 | A1 | 6/2023 | Bhaskar et al. |
| 2023/0269004 | A1 | 8/2023 | Lago Rivera et al. |
| 2023/0327778 | A1 | 10/2023 | Vacon et al. |
| 2025/0077932 | A1* | 3/2025 | Kenemer .............. G06N 10/20 |

OTHER PUBLICATIONS

Qiu, X., et al., "Quantum Teleportation of an Image", Research Square, https://www.researchsquare.com/article/rs-1219806/v1, Feb. 7, 2022, 21 pages.

Qiu X., et al., "Teleportation-based Quantum Imaging", Research Square, Jul. 6, 2023, pp. 1-29.

Sokolov I.V., et al., "Quantum Holographic Teleportation of Light Fields", arXiv:quant-ph/0007026v1, Jul. 10, 2000, pp. 1-5.

* cited by examiner

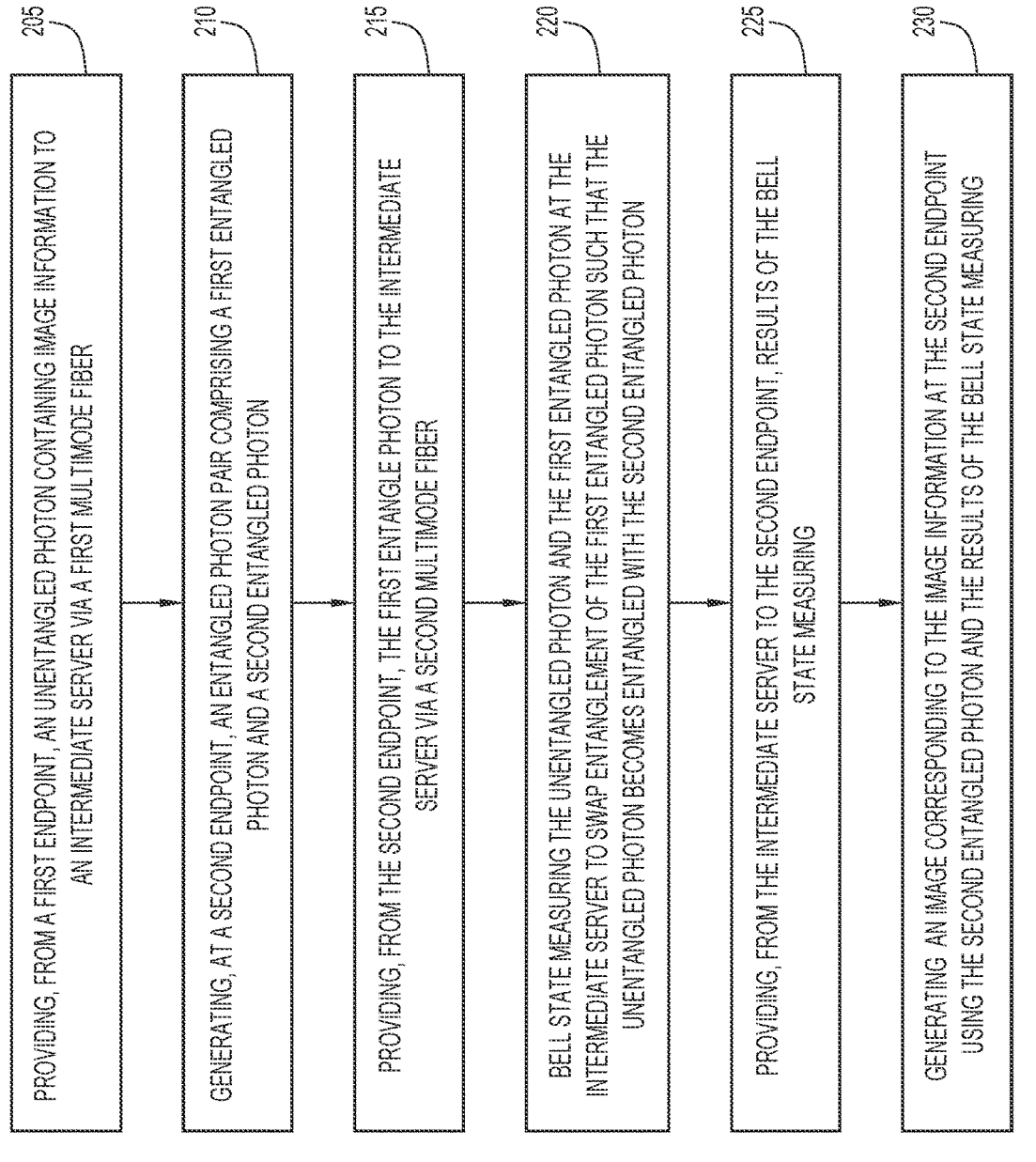

PROVIDING, FROM A FIRST ENDPOINT, AN UNENTANGLED PHOTON CONTAINING IMAGE INFORMATION TO AN INTERMEDIATE SERVER VIA A FIRST MULTIMODE FIBER — 205

GENERATING, AT A SECOND ENDPOINT, AN ENTANGLED PHOTON PAIR COMPRISING A FIRST ENTANGLED PHOTON AND A SECOND ENTANGLED PHOTON — 210

PROVIDING, FROM THE SECOND ENDPOINT, THE FIRST ENTANGLE PHOTON TO THE INTERMEDIATE SERVER VIA A SECOND MULTIMODE FIBER — 215

BELL STATE MEASURING THE UNENTANGLED PHOTON AND THE FIRST ENTANGLED PHOTON AT THE INTERMEDIATE SERVER TO SWAP ENTANGLEMENT OF THE FIRST ENTANGLED PHOTON SUCH THAT THE UNENTANGLED PHOTON BECOMES ENTANGLED WITH THE SECOND ENTANGLED PHOTON — 220

PROVIDING, FROM THE INTERMEDIATE SERVER TO THE SECOND ENDPOINT, RESULTS OF THE BELL STATE MEASURING — 225

GENERATING AN IMAGE CORRESPONDING TO THE IMAGE INFORMATION AT THE SECOND ENDPOINT USING THE SECOND ENTANGLED PHOTON AND THE RESULTS OF THE BELL STATE MEASURING — 230

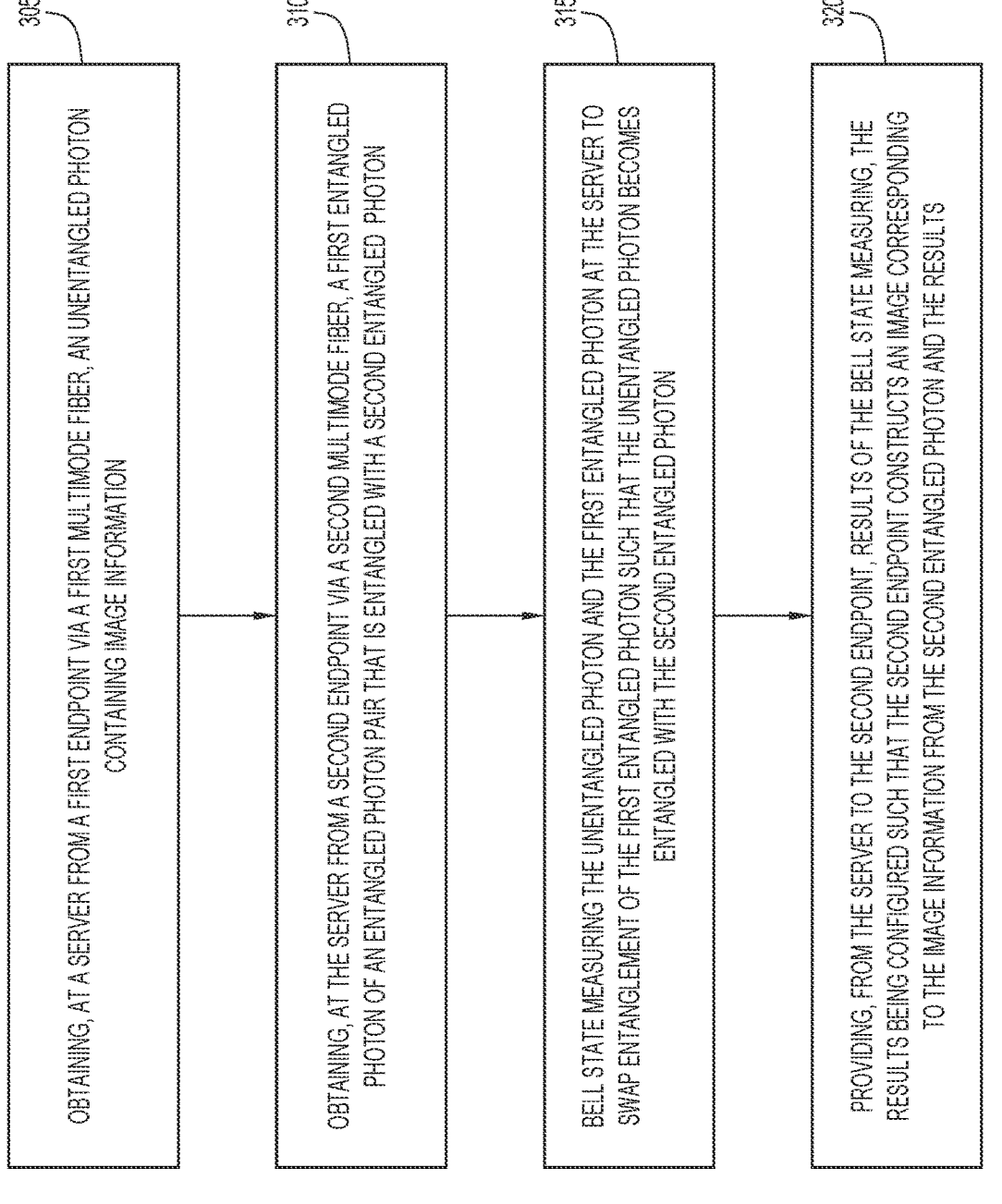

305

OBTAINING, AT A SERVER FROM A FIRST ENDPOINT VIA A FIRST MULTIMODE FIBER, AN UNENTANGLED PHOTON CONTAINING IMAGE INFORMATION

310

OBTAINING, AT THE SERVER FROM A SECOND ENDPOINT VIA A SECOND MULTIMODE FIBER, A FIRST ENTANGLED PHOTON OF AN ENTANGLED PHOTON PAIR THAT IS ENTANGLED WITH A SECOND ENTANGLED PHOTON

315

BELL STATE MEASURING THE UNENTANGLED PHOTON AND THE FIRST ENTANGLED PHOTON AT THE SERVER TO SWAP ENTANGLEMENT OF THE FIRST ENTANGLED PHOTON SUCH THAT THE UNENTANGLED PHOTON BECOMES ENTANGLED WITH THE SECOND ENTANGLED PHOTON

320

PROVIDING, FROM THE SERVER TO THE SECOND ENDPOINT, RESULTS OF THE BELL STATE MEASURING, THE RESULTS BEING CONFIGURED SUCH THAT THE SECOND ENDPOINT CONSTRUCTS AN IMAGE CORRESPONDING TO THE IMAGE INFORMATION FROM THE SECOND ENTANGLED PHOTON AND THE RESULTS

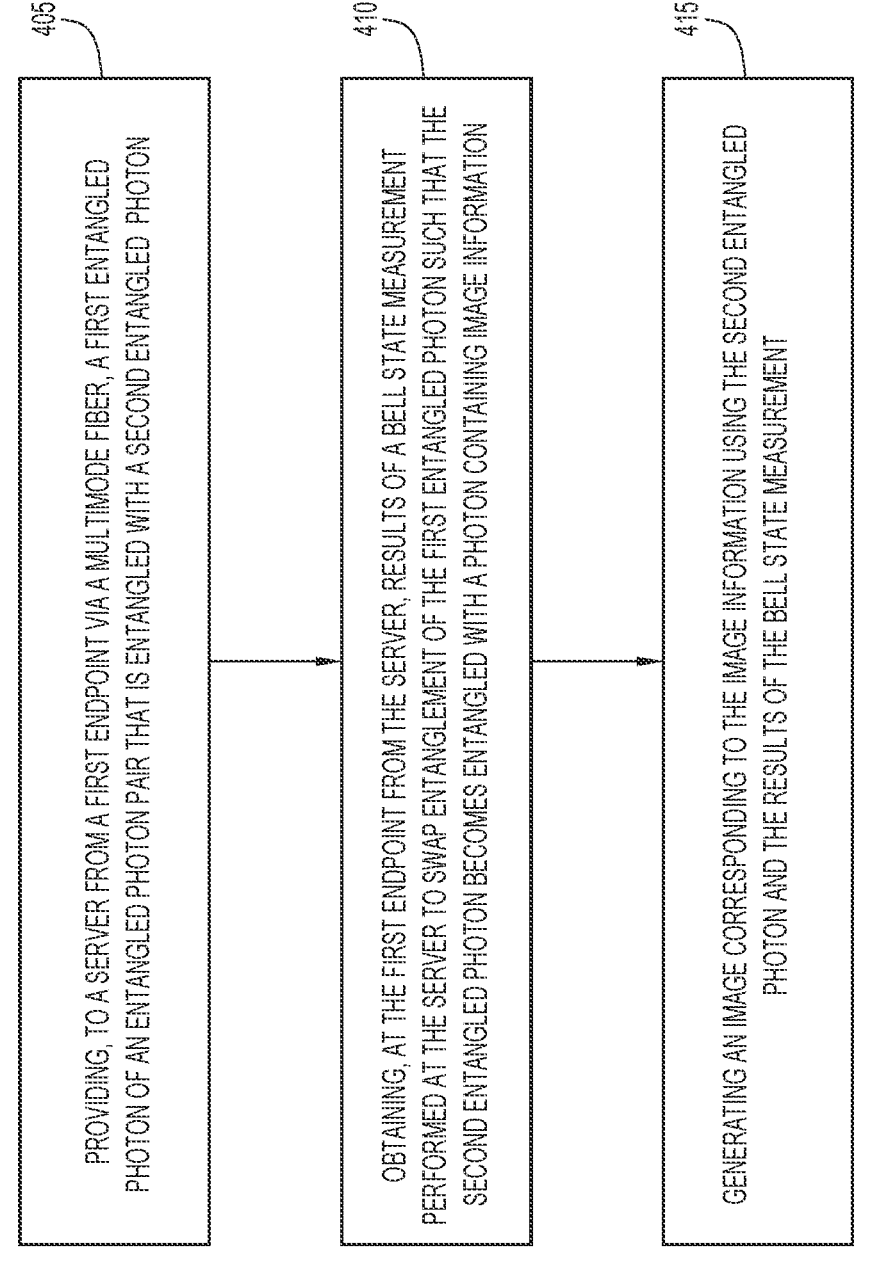

405

PROVIDING, TO A SERVER FROM A FIRST ENDPOINT VIA A MULTIMODE FIBER, A FIRST ENTANGLED PHOTON OF AN ENTANGLED PHOTON PAIR THAT IS ENTANGLED WITH A SECOND ENTANGLED PHOTON

410

OBTAINING, AT THE FIRST ENDPOINT FROM THE SERVER, RESULTS OF A BELL STATE MEASUREMENT PERFORMED AT THE SERVER TO SWAP ENTANGLEMENT OF THE FIRST ENTANGLED PHOTON SUCH THAT THE SECOND ENTANGLED PHOTON BECOMES ENTANGLED WITH A PHOTON CONTAINING IMAGE INFORMATION

415

GENERATING AN IMAGE CORRESPONDING TO THE IMAGE INFORMATION USING THE SECOND ENTANGLED PHOTON AND THE RESULTS OF THE BELL STATE MEASUREMENT

CONTROL LOGIC — 520

I/O — 514

I/O — 512

I/O — 510

NETWORK PROCESSOR UNIT(s)

508

STORAGE — 506

MEMORY ELEMENT(s) — 504

PROCESSOR(s) — 502

500

QUANTUM TELEPORTATION IMAGING

TECHNICAL FIELD

The present disclosure relates to quantum imaging.

BACKGROUND

Quantum imaging refers to the use of quantum mechanical principles and techniques in the field of imaging. Quantum imaging leverages the unique properties of quantum systems, such as superposition, entanglement and teleportation, to perform imaging tasks with enhanced capabilities beyond what classical imaging systems may achieve. Quantum imaging may be applied in various domains, including optics, microscopy, and sensing.

BRIEF DESCRIPTION OF THE DRAWINGS

FIG. 2 illustrates a first flowchart including operations performed in a distributed system to implement the quantum teleportation imaging techniques of this disclosure, according to an example embodiment.

FIG. 3 illustrates a second flowchart including operations performed at a server to implement the quantum teleportation imaging techniques of this disclosure, according to an example embodiment.

FIG. 4 illustrates a third flowchart including operations performed at an endpoint to implement the quantum teleportation imaging techniques of this disclosure, according to an example embodiment.

DETAILED DESCRIPTION

Overview

Provided for herein is a distributed system that transfers image data between two endpoints via a Bell state measurement performed at a server arranged between the endpoints. The Bell state measurement of the disclosed techniques may be a high-dimensional Bell state measurement. The successful implementation of the Bell state measurement may be facilitated, in some examples, by the coherent recovery of entanglement in multimode optical fibers.

In some aspects, the techniques described herein relate to a method including: providing, from a first endpoint, an unentangled photon containing image information to an intermediate server via a first multimode fiber; generating, at a second endpoint, an entangled photon pair including a first entangled photon and a second entangled photon; providing, from the second endpoint, the first entangled photon to the intermediate server via a second multimode fiber; Bell state measuring the unentangled photon and the first entangled photon at the intermediate server to swap entanglement of the first entangled photon such that the unentangled photon becomes entangled with the second entangled photon; providing, from the intermediate server to the second endpoint, results of the Bell state measuring; and generating an image corresponding to the image information at the second endpoint using the second entangled photon and the results of the Bell state measuring.

In some aspects, the techniques described herein relate to a method including: obtaining, at a server from a first endpoint via a first multimode fiber, an unentangled photon containing image information; obtaining, at the server from a second endpoint via a second multimode fiber, a first entangled photon of an entangled photon pair that is entangled with a second entangled photon; Bell state measuring the unentangled photon and the first entangled photon at the server to swap entanglement of the first entangled photon such that the unentangled photon becomes entangled with the second entangled photon; and providing, from the server to the second endpoint, results of the Bell state measuring, the results being configured such that the second endpoint constructs an image corresponding to the image information from the second entangled photon and the results.

In some aspects, the techniques described herein relate to a method including: providing, to a server from a first endpoint via a multimode fiber, a first entangled photon of an entangled photon pair that is entangled with a second entangled photon; obtaining, at the first endpoint from the server, results of a Bell state measurement performed at the server to swap entanglement of the first entangled photon such that the second entangled photon becomes entangled with a photon containing image information; and generating an image corresponding to the image information using the second entangled photon and the results of the Bell state measurement.

EXAMPLE EMBODIMENTS

Figure 1:
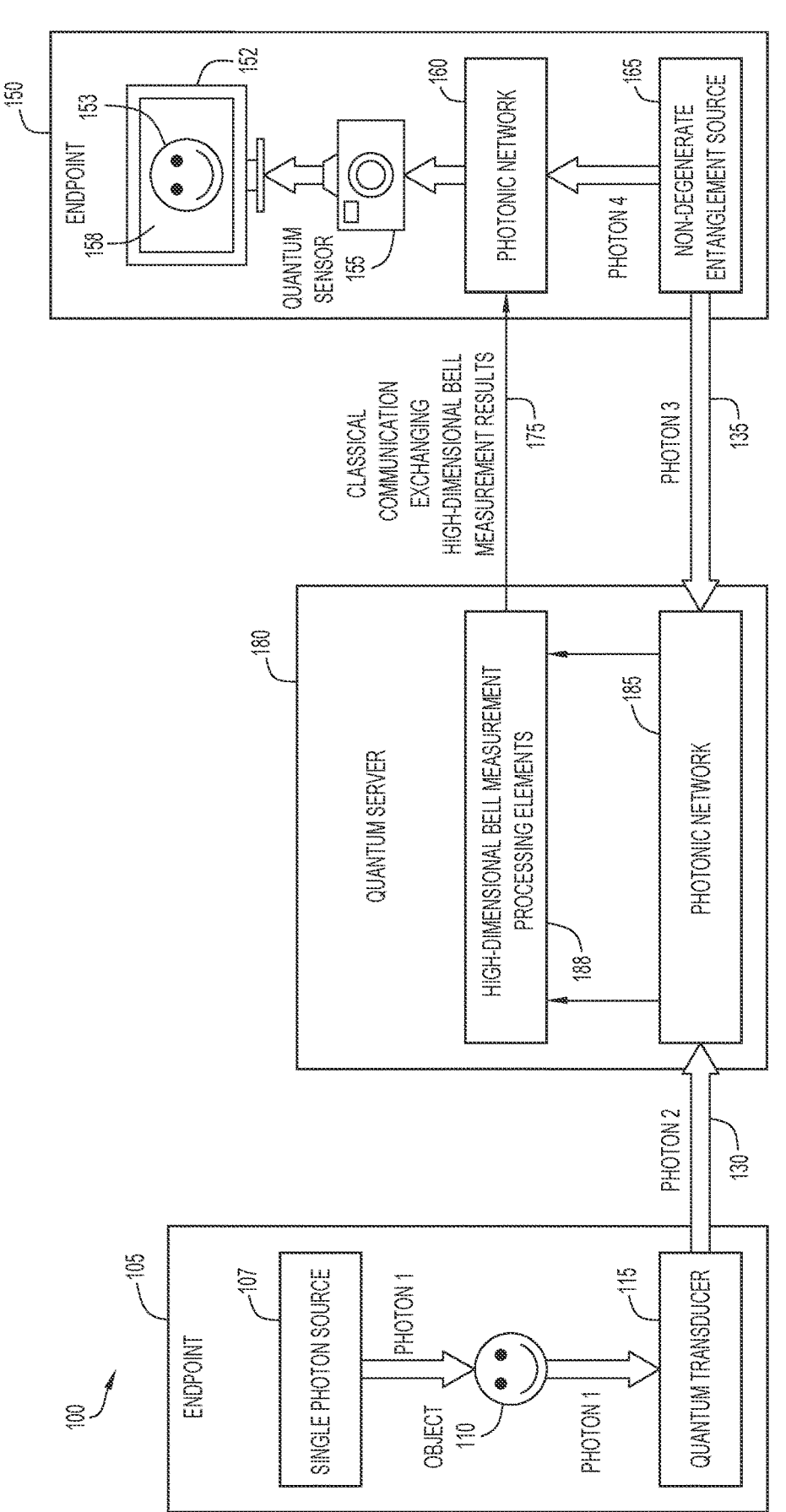
FIG. 1 is a functional block diagram of a distributed system configured to implement the quantum teleportation imaging techniques disclosed herein, according to an example embodiment.

Illustrated in FIG. 1 is a distributed system 100 configured to provide teleportation quantum imaging. Specifically, distributed system 100 provides image data between first endpoint 105 and second endpoint 150 via a high-dimensional Bell state measurement performed at a quantum server 180. As used herein, "distributed" refers nonlocal operations of an imaging system which usually involves locations separated at least a few hundreds of meters. According to the disclosed techniques, it possible for endpoints 105 and 150 to provide image data therebetween without directly classically communicating the image data. Therefore, the disclosed technique may enhance the security of the image data provided between endpoints 105 and 150. According to some specific examples, a high-dimensional Bell state measurement is performed in a spatial mode basis to significantly reduce the resources required to teleport the image data between endpoints 105 and 150. The successful implementation of a high-dimensional Bell state measurement may be implemented through coherent recovery of entanglement between photons using multimode fibers (MMFs).

As specifically illustrated in FIG. 1, first endpoint 105 includes a single photon source 107, the object 110 whose image is teleported according to the disclosed techniques, and a quantum transducer 115.

At endpoint 105, single photon source 107 generates a single visible or near infrared (NIR) first photon. In the example of FIG. 1, the first photon illuminates object 110 such that a plurality of first photons may be used to image object 110. According to other examples, the first photon may be provided with image information through other techniques, such as encoding the first photon with image information from a digital image file, or structuring the first photon with spatial light modulators. In example systems in which quantum server 180 is collocated with endpoint 105 and/or arranged relatively close to endpoint 105 such that transmission losses are generally not present, the first photon may be provided directly to quantum server 180. In a distributed system, such as distributed system 100, quantum transducer 115 is used to facilitate the efficient providing of image data encoded in the first photon to quantum server 180.

In the example of distributed system 100, quantum transducer 115 obtains the first photon and coherently transforms the first photon, which has a wavelength in the visible or NIR ranges, to a second photon with a wavelength in a telecommunications band. As used herein, "telecommunications band" refers to a band of wavelengths used to transmit electromagnetic radiation through optical fibers over long distances. For example, fiber-optic communication is mainly conducted in the wavelength region where optical fibers have small transmission loss. This low-loss wavelength region ranges from 1260 nm to 1625 nm, and is divided into five wavelength bands referred to as the O-, E-, S-, C- and L-bands. Accordingly, quantum transducer 115 coherently transforms the first photon to a second photon with a wavelength between 1260 nm and 1625 nm. The transformation performed by quantum transducer 115 is considered "coherent" because if transfers the information, such as one or more of amplitude and phase information, about the object 110 that was encoded into the first photon, such as phase and amplitude information, onto the second photon.

As indicated above, photons may be encoded with image information without actually illuminating an image, such as encoding the photon with image information based on a digital image file or through the use of a spatial light modulator. In such instances, the photon that is initially encoded with the image information may be generated with a wavelength in the telecommunication band directly from single photon source 107, allowing for the elimination of object 110 and quantum transducer 115.

Regardless of how a photon is generated with a wavelength in a telecommunication band with image information, the photon is then provided to quantum server 180 via MMF 130.

Concurrent with the operations described above with reference to first endpoint 105, additional operations may take place at second endpoint 150. As illustrated in FIG. 1, endpoint 150 includes a processing device 152 including a display 158, a quantum sensor 155, a photonic network 160 configured to provide a conditioned unitary transform, and a non-degenerate entangled photon source 165. Non-degenerate photon source 165 generates an entangled pair of photons that includes a third photon and a fourth photon. The third photon of the entangled pair of photons may be generated with a wavelength in a telecommunications band (i.e., 1260-1625 nm) and is provided to server 180 via MMF 135. The fourth photon, like the first photon of endpoint 105, may be generated with a wavelength in the visible/NIR range. The fourth photon is provided to photonic network 160 for processing. The processing of the fourth photon, however, may be delayed therein until processing at server 180 has completed. To facilitate this delay, photonic network 160 may include one more optical delay lines and/or quantum memories that allow for the storage and/or recreation of the fourth photon until after certain operations take place at quantum server 180.

Turning to server 180, server 180 obtains the second photon from endpoint 105 and obtains the third photon from endpoint 150. The photonic network 185 provides calibration and correction to the second photon and the third photon to compensate for known or measurable channel errors in the transmission of the second photon and the third photon from endpoint 105 and endpoint 150, respectively. The calibration and correction of the second photon recover the image information for object 110 from the second photon. The calibration and correction of the third photon recover the entanglement with the fourth photon from the third photon. The calibration and correction of the second and third photons may be performed using technologies known to the skilled artisan. For example, polarization phase retrieval of a classical beacon beam in the same multimode fiber, which requires the use of polarization beam splitters with high resolution digital cameras, may be used to perform the calibration and correction. More specifically, in addition to the second photon, a classical beacon beam may be provided to server 180 via MMF 130. Polarization phase retrieval performed on this classical beacon beam may be used to calibrate and correct the second photon. Similarly, a classical beacon beam provided to server 180 via MMF 135 may be used to calibrate and correct the third photon.

To correct phase errors of the photons, the conjugate phase of the retrieved phase may be added to the second and third photon, respectively. This phase modulation can be performed by a spatial light modulator. To acquire a high accuracy phase correction, more iterations of the phase retrieval may be performed on the classical beacon beam. Once the phase error is reduced to a global minimal value, the phase correction and calibration process may be considered as success.

Once the second photon and third photon have been calibrated and corrected, the entanglement of the third photon with the fourth photon is swapped with the second photon through the use of a Bell state measurement that is simultaneously performed on the second photon and the third photon. More specifically, a high-dimensional Bell state measurement is performed on the spatial degrees of freedom of the second photon and the third photon using the high dimensional Bell state measurement processing elements 188 of quantum server 180.

As used herein, a Bell state measurement is "high-dimensional" if it is performed in a high-dimensional Hilbert space which, in this example, refers to a large number of eigenstates in the spatial degree of freedom. Furthermore, it may be understood that Hilbert spaces with dimension higher than 2 are high dimensional Hilbert spaces. Accordingly, a Bell state measurement according to the disclosed techniques is "high dimensional" if it is a Bell state measurement made with 3 or more dimensions. Other example Bell state measurements may be made with 3-5 dimensions, 5-10 dimensions, 10-20 dimensions, or greater than 20 dimensions. For example, a distributed system, such as system 100 of FIG. 1, may perform a Bell state measurement in a Hilbert space with a few hundred eigenstates in the spatial degree of freedom.

According to a first example, the high-dimensional Bell state measurement utilizes individual pixels as the degrees of freedom for the measurement. Using individual pixels as the degrees of freedom may be difficult to scale as the resource requirements for the Bell state measurement scale significantly as the image size increases. Therefore, other examples may use spatial modes, such as Laguerre Gaussian spatial modes or Hermite Gaussian spatial modes, as the spatial degrees of freedom decomposition basis for the high-dimensional Bell state measurement to greatly reduce the scale of resources used to perform the measurement. Laguerre Gaussian spatial modes and Hermite Gaussian spatial modes form a complete and orthogonal basis for a 2D image space, and the image captured by the first photon can be decomposed into a combination of fewer spatial modes than the number of pixels in the image. Accordingly, one can decompose a high-resolution image with a number of spatial modes much smaller than the number of pixels, which reduces the resources required for the high-dimensional Bell state measurement.

Upon completion of the Bell state measurement, quantum server 180 provides, e.g., transmits, the results of the high-dimensional Bell state measurement between the second photon and the third photon to endpoint 150 via classical communication 175. As a classical communication, communication 175 may be embodied as one or more digital, analog, electrical or optical communication signals provided to second endpoint 150 by one or more wired or wireless networks.

Returning to endpoint 150, photonic network 160 uses the results of the high-dimensional Bell state measurement to perform a conditioned unitary transform on the fourth photon. The conditioned unitary transform effectively teleports the quantum state of the first photon (which were transferred to the second photon via quantum transducer 115 of endpoint 105) onto the fourth photon at the endpoint 150 using photonic network 160.

Quantum sensor 155 then detects the fourth photon, which carries the same information about object 110 as the first photon. Quantum sensor 155 may be embodied as a known quantum sensor, such as an electron-multiplying charge-coupled device (EMCCD). Accordingly, quantum sensor 155 at endpoint 150 captures the image of the object 110 of endpoint 105 through the effective teleportation of the image information of the first photon to the fourth photon. The output of quantum sensor 155 is provided to processing device 152, and after a sufficient number of repetitions of the process described above, processing device 152 may generate image 153 of object 110. While FIG. 1 illustrates image 153 as being displayed on display 158, the generation of the image 153 may be embodied as the creation and/or storage of image data that is configured to generate image 153, even if image 153 is never actually displayed to a user or on a display device.

As illustrated through the discussion above, distributed system 100 transfers image data between endpoint 105 and endpoint 150 via a high-dimensional Bell state measurement performed at server 180. Endpoint 105 and endpoint 150 do not directly communicate classically, enhancing security of the image data. The high-dimensional Bell state measurement may be performed in a spatial mode basis to significantly reduce the resources required to teleport the image data. The successful implementation of the high-dimensional Bell state measurement may be guaranteed by the coherent recovery of entanglement in MMFs.

With reference now made to FIG. 2, depicted therein is a flowchart 200 illustrating a process flow for implementing the quantum teleportation imaging techniques of this disclosure in a distributed system, such as system 100 of FIG. 1.

Flowchart 200 begins in operation 205 in which an unentangled photon containing image information is provided from a first endpoint to a server via a first multimode fiber. Accordingly, operation 205 may be embodied as the providing of the second photon to the server 180 from endpoint 105, as illustrated above in FIG. 1. As also discussed above, if server 180 is arranged sufficiently close to endpoint 105, or incorporated into endpoint 105, operation 205 may be embodied as endpoint 105 providing the first photon, i.e., the photon that illuminates object 110, to server 180. Included as part of operation 205, or in addition to operation 205, may be operations that result in the second photon being encoded with the image information. These operation may include the generation of the first photon via single photon source 107, illuminating object 110 with the first photon, and quantum transducer 115 transferring the image information from the first photon to the second photon, as illustrated in FIG. 1.

Next, a second endpoint generates an entangled photon pair in operation 210. The entangled photon pair includes a first entangled photon and a second entangled photon. Accordingly, operation 210 may be embodied as non-degenerate entangled photon source 165 of endpoint 150 generating the third photon and the fourth photon, as described above with reference to FIG. 1.

In operation 215, the first entangled photon is provided to the intermediate server via a second multimode fiber. Accordingly, operation 215 may be embodied as second endpoint 150 providing the third photon to server 180, as described above with reference to FIG. 1.

In operation 220, a Bell state measurement is performed on the unentangled photon and the first entangled photon at the intermediate server. This Bell state measurement swaps the entanglement of first entangled photon such that the unentangled photon becomes entangled with the second entangled photon. Operation 220 may be embodied as the Bell state measurement performed by server 180 as illustrated in FIG. 1.

Next, in operation 225, results of the Bell state measurement performed in operation 220 are provided from the server to the second endpoint. Accordingly, operation 225 may be embodied by classical communication 175 in which the results of the Bell state measurement performed by server 180 are provided to endpoint 150, as illustrated in FIG. 1.

Finally, in operation 230, an image is generated at the second endpoint using the second entangled photon and the results of the Bell state measurement performed in operation 220. Because the entanglement of the second entangled photon has been swapped to the unentangled photon, the image corresponds to the image information contained in the unentangled photon. According, operation 230 may be embodied as the generation of image 153 as illustrated in FIG. 1. Similar to the discussion above with respect to operation 205, included in operation 230 may be a number of other operations, including: performing a conditioned unitary transform on the second entangled photon; detecting the second entangled photon at a quantum sensor, such as quantum sensor 155, or generating image data at a processing device, such as processing device 152, as illustrated in FIG. 1.

Like the individual operations of flowchart 200, flowchart 200 may include more or fewer operations without deviating from the disclosed quantum teleportation imaging techniques disclosed herein. For example, the operations of flowchart 200 may be repeated a sufficient number of times to generate an image with an intended quality, an intended resolution, or other qualities known to the skilled artisan. As another example, flowchart 200 may include operations in which the intermediate server corrects and calibrates the unentangled photon and/or the first entangled photon. Furthermore, while flowchart 200 is directed to operations performed in a system, such as distributed system 100 of FIG. 1, the disclosed techniques may also be understood with respect to the operations performed at a single one of endpoint 105, server 180, and/or endpoint 150.

Turning to FIG. 3, depicted therein is a flowchart 300 illustrating a generalized process flow for implementing the disclosed quantum teleportation imaging techniques at a server, such as server 180 of FIG. 1. Flowchart 300 begins in operation 305 in which an unentangled photon is obtained at a server from a first endpoint via a first multimode fiber. Accordingly, operation 305 may be embodied as server 180 obtaining the second photon, as illustrated in FIG. 1. In operation 310, a first entangled photon is obtained at the server from a second endpoint via a multimode fiber. The first entangled photon is entangled with a second entangled photon, with the first entangled photon and the second entangled photon forming an entangled photon pair. Accordingly, operation 310 may be embodied as server 180 receiving the third photon, as illustrated in FIG. 1.

Next, in operation 315, a Bell state measurement is performed on the unentangled photon and the first entangled photon at the server. This Bell state measurement swaps the entanglement of first entangled photon such that the unentangled photon becomes entangled with the second entangled photon. Operation 315 may be embodied as the Bell state measurement performed by server 180 as illustrated in FIG. 1.

Finally, in operation 320, results of the Bell state measurement performed in operation 310 are provided from the server to the second endpoint. The results of the Bell state measurement are provided to the second endpoint such that the second endpoint constructs an image corresponding to the image information using the second entangled photon and the results. Specifically, because the second entangled photon has been entangled with the previously unentangled photon, the second entangled photon may now be processed such that the image information may be derived from the second entangled photon using the results of the Bell state measurement. Accordingly, operation 320 may be embodied as classical communication 175 between server 180 and endpoint 150 of FIG. 1.

Similar flowchart 200 of FIG. 2, flowchart 300 may include more or fewer operations without deviating from the inventive concepts of this disclosure. For example, the operations of flowchart 300 may be repeated a sufficient number of times to allow the second endpoint to generate an image with an intended quality, an intended resolution, or other qualities known to the skilled artisan. As another example, flowchart 300 may include operations in which the server corrects and calibrates the unentangled photon and/or the first entangled photon.

With reference now made to FIG. 4, depicted therein is a flowchart 400 illustrating a generalized process flow for implementing the disclosed quantum teleportation imaging techniques at an image generating endpoint, such as endpoint 150 of FIG. 1. Flowchart 400 begins in operation 405 where a first entangled photon is provided to a server via a multimode fiber. The first entangled photon is part of an entangled photon pair and is entangled with a second entangled photon. Accordingly, operation 405 may be embodied as second endpoint 150 providing the third photon to server 180, as described above with reference to FIG. 1. Operation 405 may incorporate or be preceded by additional operations without deviating from the disclosed quantum teleportation imaging techniques. For example, included in operation 405 may be the generation of the entangled photon pair, such as through the operation of non-degenerate entangled photon source 165 of FIG. 1.

In operation 410, the results of a Bell state measurement are obtained at the first endpoint. The Bell state measurement of operation 410 was performed at the server and swapped the entanglement of the first entangled photon such that the second entangled photon becomes entangled with a photon containing image information. Accordingly, operation 410 may be embodied as classical communication 175 between server 180 and endpoint 150 of FIG. 1.

Finally, in operation 415, an image corresponding to the image information is generated using the second entangled photon and the results of the Bell state measurement. According, operation 415 may be embodied as the generation of image 153 as illustrated in FIG. 1. Similar to the discussion above with respect to operation 405, included in operation 410 may be a number of other operations, including: performing a conditioned unitary transform on the second entangled photon; detecting the second entangled photon at a quantum sensor, such as quantum sensor 155, or generating image data at a processing device, such as processing device 152, as illustrated in FIG. 1.

Figure 5:
FIG. 5 illustrates a hardware block diagram of a computing device configured to implement the quantum teleportation imaging techniques of this disclosure, according to an example embodiment.

Referring to FIG. 5, FIG. 5 illustrates a hardware block diagram of a computing device 500 that may perform functions associated with operations discussed herein in connection with the techniques depicted in FIGS. 1-4. In various embodiments, a computing device or apparatus, such as computing device 500 or any combination of computing devices 500, may be configured as any entity/entities as discussed for the techniques depicted in connection with FIGS. 1-4 in order to perform operations of the various techniques discussed herein.

In at least one embodiment, the computing device 500 may be any apparatus that may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/ antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In summary, provided for herein is a distributed system that transfers image data between two endpoints via a high-dimensional Bell state measurement performed at a server arranged between the endpoints. The endpoints do not directly communicate classically, enhancing security of the image data. The high-dimensional Bell state measurement may be performed in spatial mode basis to significantly reduce the resources required to teleport the image data. The successful implementation of the high-dimensional Bell state measurement is guaranteed by the coherent recovery of entanglement in MMFs.

Accordingly, in some aspects, the techniques described herein relate to a method including: providing, from a first endpoint, an unentangled photon containing image information to an intermediate server via a first multimode fiber; generating, at a second endpoint, an entangled photon pair including a first entangled photon and a second entangled photon; providing, from the second endpoint, the first entangled photon to the intermediate server via a second multimode fiber; Bell state measuring the unentangled photon and the first entangled photon at the intermediate server to swap entanglement of the first entangled photon such that the unentangled photon becomes entangled with the second entangled photon; providing, from the intermediate server to the second endpoint, results of the Bell state measuring; and generating an image corresponding to the image information at the second endpoint using the second entangled photon and the results of the Bell state measuring.

In some aspects, the techniques described herein relate to a method, further including recovering, at the intermediate server, the image information by calibrating and correcting noise from the first multimode fiber.

In some aspects, the techniques described herein relate to a method, further including recovering entanglement between the first entangled photon and the second entangled photon by calibrating and correcting noise from the second multimode fiber.

In some aspects, the techniques described herein relate to a method, wherein the Bell state measuring includes performing a high-dimensional Bell state measurement on the unentangled photon and the first entangled photon.

In some aspects, the techniques described herein relate to a method, wherein the high-dimensional Bell state measurement includes a Bell state measurement that uses image pixels as spatial degrees of freedom of the Bell state measurement.

In some aspects, the techniques described herein relate to a method, wherein the high-dimensional Bell state measurement includes a Bell state measurement that uses spatial modes as spatial degrees of freedom of the Bell state measurement.

In some aspects, the techniques described herein relate to a method, wherein the spatial modes include Laguerre Gaussian spatial modes or Hermite Gaussian spatial modes.

In some aspects, the techniques described herein relate to a method, wherein: generating the unentangled photon includes generating the unentangled photon with a first wavelength in a telecommunication wavelength; and generating the entangled photon pair includes generating the first entangled photon with a second wavelength in a telecommunication wavelength.

In some aspects, the techniques described herein relate to a method, wherein providing the results of the Bell state measuring includes providing results of a Bell state measurement via a classical communication channel.

In some aspects, the techniques described herein relate to a method including: obtaining, at a server from a first endpoint via a first multimode fiber, an unentangled photon containing image information; obtaining, at the server from a second endpoint via a second multimode fiber, a first entangled photon of an entangled photon pair that is entangled with a second entangled photon; Bell state measuring the unentangled photon and the first entangled photon at the server to swap entanglement of the first entangled photon such that the unentangled photon becomes entangled with the second entangled photon; and providing, from the server to the second endpoint, results of the Bell state measuring, the results being configured such that the second endpoint constructs an image corresponding to the image information from the second entangled photon and the results.

In some aspects, the techniques described herein relate to a method, further including recovering the image information by calibrating and correcting noise from the first multimode fiber.

In some aspects, the techniques described herein relate to a method, further including recovering entanglement between the first entangled photon and the second entangled photon by calibrating and correcting noise from the second multimode fiber.

In some aspects, the techniques described herein relate to a method, wherein the Bell state measuring includes performing a high-dimensional Bell state measurement on the unentangled photon and the first entangled photon.

In some aspects, the techniques described herein relate to a method, wherein the high-dimensional Bell state measurement includes a Bell state measurement that uses image pixels as spatial degrees of freedom of the Bell state measurement.

In some aspects, the techniques described herein relate to a method, wherein: obtaining the unentangled photon includes obtaining the unentangled photon with a first wavelength in a telecommunication wavelength; and obtaining the entangled photon pair includes obtaining the first entangled photon with a second wavelength in a telecommunication wavelength.

In some aspects, the techniques described herein relate to a method including: providing, to a server from a first endpoint via a multimode fiber, a first entangled photon of an entangled photon pair that is entangled with a second entangled photon; obtaining, at the first endpoint from the server, results of a Bell state measurement performed at the server to swap entanglement of the first entangled photon such that the second entangled photon becomes entangled with a photon containing image information; and generating an image corresponding to the image information using the second entangled photon and the results of the Bell state measurement.

In some aspects, the techniques described herein relate to a method, wherein obtaining the results of the Bell state measurement includes obtaining the results of a high-dimensional Bell state measurement.

In some aspects, the techniques described herein relate to a method, wherein obtaining the results of a high-dimensional Bell state measurement includes obtaining the results of a Bell state measurement that uses image pixels as spatial degrees of freedom of the Bell state measurement.

In some aspects, the techniques described herein relate to a method, wherein obtaining the results of a high-dimensional Bell state measurement includes obtaining the results of a Bell state measurement that uses spatial modes as spatial degrees of freedom of the Bell state measurement.

In some aspects, the techniques described herein relate to a method, wherein obtaining the results of the Bell state measurement includes obtaining the results of the Bell state measurement via a classical communication channel.

In some aspects, the techniques described herein relate to an apparatus including: one or more network interfaces; and one or more processors, wherein the one or more processors are configured to perform operations on behalf of a server, the operations including: obtaining, at the server from a first endpoint via a first multimode fiber connected to the one or more network interfaces, an unentangled photon containing image information; obtaining, at the server from a second endpoint via a second multimode fiber connected to the one or more network interfaces, a first entangled photon of an entangled photon pair that is entangled with a second entangled photon; Bell state measuring the unentangled photon and the first entangled photon at the server to swap entanglement of the first entangled photon such that the unentangled photon becomes entangled with the second entangled photon; and providing, from the server to the second endpoint via the one or more network interfaces, results of the Bell state measuring, the results being configured such that the second endpoint constructs an image corresponding to the image information from the second entangled photon and the results.

In some aspects, the techniques described herein relate to an apparatus, wherein the one or more network interfaces include one or more optical network interfaces configured to interface with the first multimode fiber and the second multimode fiber.

In some aspects, the techniques described herein relate to an apparatus, wherein the operations further include recovering the image information by calibrating and correcting noise from the first multimode fiber.

In some aspects, the techniques described herein relate to an apparatus, wherein the operations further include recovering entanglement between the first entangled photon and the second entangled photon by calibrating and correcting noise from the second multimode fiber.

In some aspects, the techniques described herein relate to an apparatus, wherein Bell state measuring the unentangled photon and the first entangled photon includes performing a high-dimensional Bell state measurement on the unentangled photon and the first entangled photon.

In some aspects, the techniques described herein relate to an apparatus, wherein Bell state measuring the unentangled photon and the first entangled photon includes a Bell state measurement that uses image pixels as spatial degrees of freedom of the Bell state measurement.

In some aspects, the techniques described herein relate to an apparatus, wherein: obtaining the unentangled photon includes obtaining the unentangled photon with a first wavelength in a telecommunication wavelength; and obtaining the entangled photon pair includes obtaining the first entangled photon with a second wavelength in a telecommunication wavelength.

In some aspects, the techniques described herein relate to an apparatus including: one or more network interfaces; and one or more processors, wherein the one or more processors are configured to perform operations on behalf of a first endpoint, the operations including: providing, to a server from the first endpoint via a multimode fiber connected to the one or more network interfaces, a first entangled photon of an entangled photon pair that is entangled with a second entangled photon; obtaining, at the first endpoint from the server via the one or more network interfaces, results of a Bell state measurement performed at the server to swap entanglement of the first entangled photon such that the second entangled photon becomes entangled with a photon containing image information; and generating an image corresponding to the image information using the second entangled photon and the results of the Bell state measurement.

In some aspects, the techniques described herein relate to an apparatus, wherein the one or more network interfaces include one or more optical network interfaces configured to interface with the multimode fiber.

In some aspects, the techniques described herein relate to an apparatus, wherein obtaining the results of the Bell state measurement includes obtaining the results of a high-dimensional Bell state measurement.

In some aspects, the techniques described herein relate to an apparatus, wherein obtaining the results of a high-dimensional Bell state measurement includes obtaining the results of a Bell state measurement that uses image pixels as spatial degrees of freedom of the Bell state measurement.

In some aspects, the techniques described herein relate to an apparatus, wherein obtaining the results of a high-dimensional Bell state measurement includes obtaining the results of a Bell state measurement that uses spatial modes as spatial degrees of freedom of the Bell state measurement.

In some aspects, the techniques described herein relate to an apparatus, wherein, wherein obtaining the results of the Bell state measurement includes obtaining the results of the Bell state measurement via a classical communication channel.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   providing, from a first endpoint, an unentangled photon containing image information to an intermediate server via a first multimode fiber;
   generating, at a second endpoint, an entangled photon pair comprising a first entangled photon and a second entangled photon;
   providing, from the second endpoint, the first entangled photon to the intermediate server via a second multimode fiber;
   Bell state measuring the unentangled photon and the first entangled photon at the intermediate server to swap entanglement of the first entangled photon such that the unentangled photon becomes entangled with the second entangled photon;
   providing, from the intermediate server to the second endpoint, results of the Bell state measuring; and
   generating an image corresponding to the image information at the second endpoint using the second entangled photon and the results of the Bell state measuring.

2. The method of claim 1, further comprising recovering, at the intermediate server, the image information by calibrating and correcting noise from the first multimode fiber.

3. The method of claim 1, further comprising recovering entanglement between the first entangled photon and the second entangled photon by calibrating and correcting noise from the second multimode fiber.

4. The method of claim 1, wherein the Bell state measuring comprises performing a high-dimensional Bell state measurement on the unentangled photon and the first entangled photon.

5. The method of claim 4, wherein the high-dimensional Bell state measurement comprises a Bell state measurement that uses image pixels as spatial degrees of freedom of the Bell state measurement.

6. The method of claim 4, wherein the high-dimensional Bell state measurement comprises a Bell state measurement that uses spatial modes as spatial degrees of freedom of the Bell state measurement.

7. The method of claim 6, wherein the spatial modes comprise Laguerre Gaussian spatial modes or Hermite Gaussian spatial modes.

8. The method of claim 1, wherein:

generating the unentangled photon comprises generating the unentangled photon with a first wavelength in a telecommunication wavelength; and generating the entangled photon pair comprises generating the first entangled photon with a second wavelength in a telecommunication wavelength.

9. The method of claim 1, wherein providing the results of the Bell state measuring comprises providing results of a Bell state measurement via a classical communication channel.

10. A method comprising:

obtaining, at a server from a first endpoint via a first multimode fiber, an unentangled photon containing image information;

obtaining, at the server from a second endpoint via a second multimode fiber, a first entangled photon of an entangled photon pair that is entangled with a second entangled photon;

Bell state measuring the unentangled photon and the first entangled photon at the server to swap entanglement of the first entangled photon such that the unentangled photon becomes entangled with the second entangled photon; and providing, from the server to the second endpoint, results of the Bell state measuring, the results being configured such that the second endpoint constructs an image corresponding to the image information from the second entangled photon and the results.

11. The method of claim 10, further comprising recovering the image information by calibrating and correcting noise from the first multimode fiber.

12. The method of claim 10, further comprising recovering entanglement between the first entangled photon and the second entangled photon by calibrating and correcting noise from the second multimode fiber.

13. The method of claim 10, wherein the Bell state measuring comprises performing a high-dimensional Bell state measurement on the unentangled photon and the first entangled photon.

14. The method of claim 13, wherein the high-dimensional Bell state measurement comprises a Bell state measurement that uses image pixels as spatial degrees of freedom of the Bell state measurement.

15. The method of claim 10, wherein:

obtaining the unentangled photon comprises obtaining the unentangled photon with a first wavelength in a telecommunication wavelength; and obtaining the entangled photon pair comprises obtaining the first entangled photon with a second wavelength in a telecommunication wavelength.

16. A method comprising:

providing, to a server from a first endpoint via a multimode fiber, a first entangled photon of an entangled photon pair that is entangled with a second entangled photon;

obtaining, at the first endpoint from the server, results of a Bell state measurement performed at the server to swap entanglement of the first entangled photon such that the second entangled photon becomes entangled with a photon containing image information; and generating an image corresponding to the image information using the second entangled photon and the results of the Bell state measurement.

17. The method of claim 16, wherein obtaining the results of the Bell state measurement comprises obtaining the results of a high-dimensional Bell state measurement.

18. The method of claim 17, wherein obtaining the results of a high-dimensional Bell state measurement comprises obtaining the results of a Bell state measurement that uses image pixels as spatial degrees of freedom of the Bell state measurement.

19. The method of claim 17, wherein obtaining the results of a high-dimensional Bell state measurement comprises obtaining the results of a Bell state measurement that uses spatial modes as spatial degrees of freedom of the Bell state measurement.

20. The method of claim 17, wherein obtaining the results of the Bell state measurement comprises obtaining the results of the Bell state measurement via a classical communication channel.

* * * * *